Figure 1:
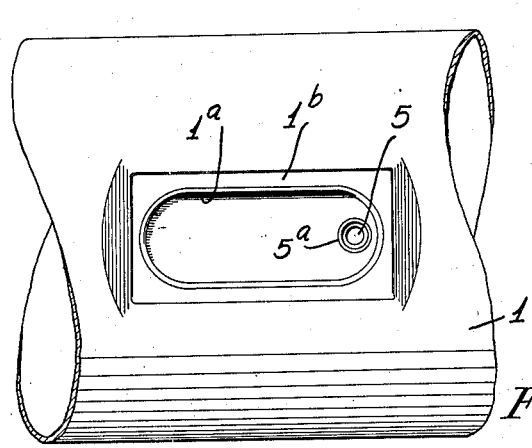

Sept. 13, 1938.     S. FREY     2,129,758

GATE APPARATUS FOR SURFACE IRRIGATION PIPES

Filed Sept. 1, 1936     2 Sheets-Sheet 1

Inventor
Sigmund Frey
By A. B. Bowman
Attorney

Sept. 13, 1938.  S. FREY  2,129,758
GATE APPARATUS FOR SURFACE IRRIGATION PIPES
Filed Sept. 1, 1936  2 Sheets-Sheet 2
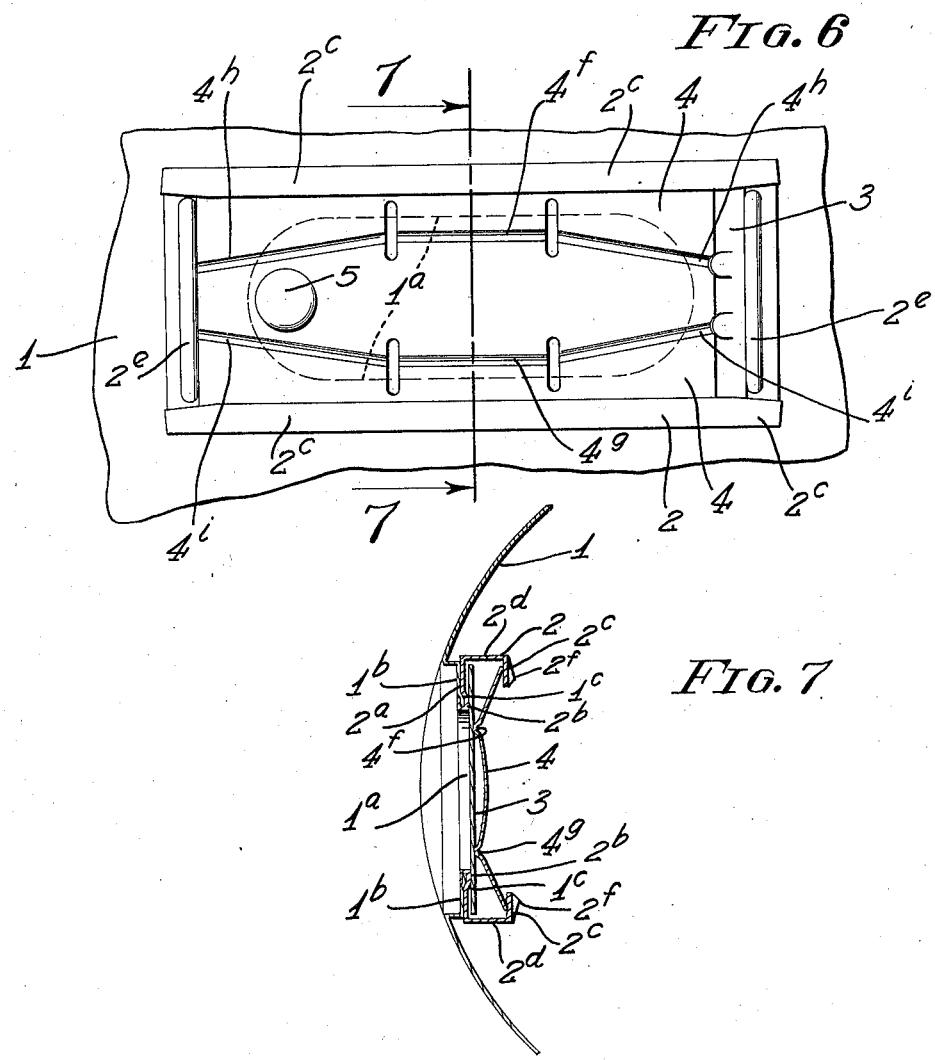
Inventor
Sigmund Frey
By A. B. Bowman
Attorney Patented Sept. 13, 1938

2,129,758

UNITED STATES PATENT OFFICE 2,129,758

GATE APPARATUS FOR SURFACE IRRIGATION PIPES

Sigmund Frey, Los Angeles, Calif.

Application September 1, 1936, Serial No. 98,891

7 Claims. (Cl. 137—69)

My invention relates to a gate apparatus for surface irrigation pipes and the primary object of this invention is improvements over my application for Gate for irrigation pipes and the like filed in the United States Patent Office July 31, 1931, Serial No. 554,256, and the objects of these improvements are:

First, to provide a gate apparatus of elongated form with its major axis longitudinally of the pipe which will form a tight fit with the wall of the opening its full length;

Second, to provide a gate apparatus of this class in which a gate is supported intermediate its sides by spring means for providing spring tension on the gate, the full length of the gate;

Third, to provide a gate apparatus of this class in which the spring is variably yieldable in section to provide for uneven surface in the gate and wall of the opening;

Fourth, to provide a gate apparatus of this class in which the gate may be made of relatively thin material and supported by variable sectional spring tension against the surface surrounding the opening whereby a tight joint is made over the whole surface surrounding the opening;

Fifth, to provide a gate apparatus of this class which is easily assembled while constructing the same;

Sixth, to provide a gate apparatus of this class which is easily operated for opening and closing and yet provides a tight fit throughout;

Seventh, to provide a gate of this class which will form a tight fit throughout its full length even if the gate or the wall surrounding the gate is dented or bent;

Eighth, to provide a new and novel stop means for the gate at both the open and closed positions;

Ninth, to provide a gate apparatus of this class with spring means which engages the gate at points spaced from the longitudinal center of the gate whereby the central portion of the spring is warpable under the spring action thus providing a spring relation with the gate of great efficiency;

Tenth, to provide a novel means of supporting the spring relatively to the gate; and Eleventh, to provide a novelly constructed gate apparatus of this class which is very simple and economical of construction, which may be used in connection with various classes and sizes of pipes, and in which the gate will not stick but is easy to operate by opening and closing, and which will not readily deteriorate or get out of order.

Figure 3:
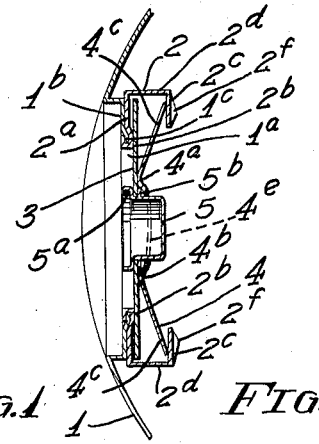
Figure 2:
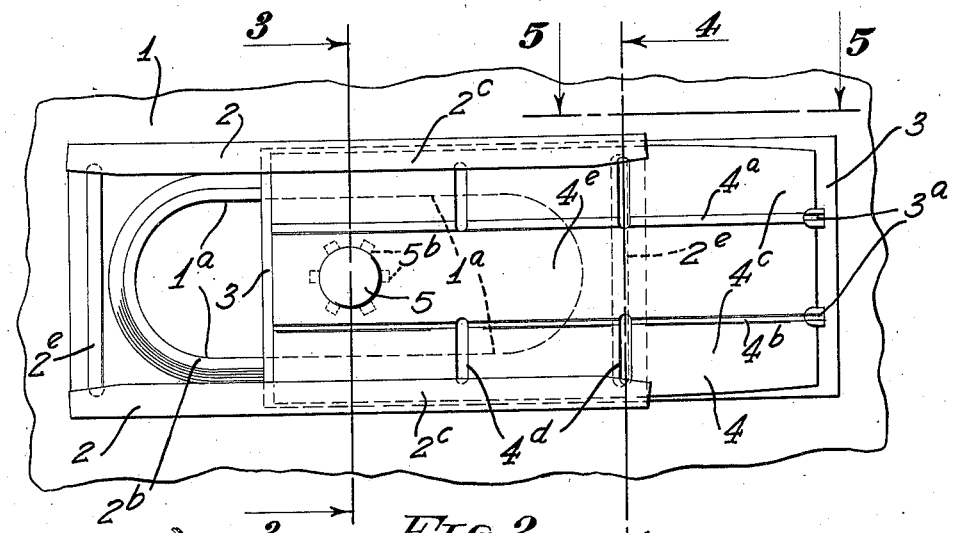
Figure 4:
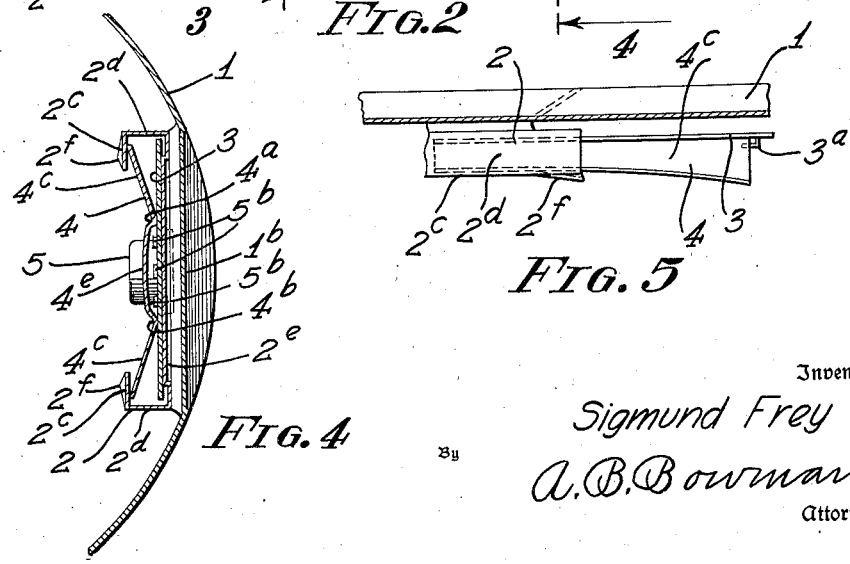
Figure 5:
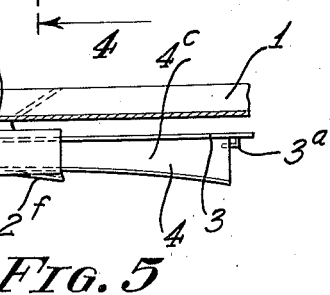

With these and other objects in view as will appear hereinafter, my invention consists of certain novel features of construction, combination, and arrangement of parts and portions as will be hereinafter described in detail and particularly set forth in the appended claims, reference being had to the accompanying drawings and to the characters of reference thereon which form a part of this application in which:

Figure 1 is a side view of a fragmentary portion of a surface irrigation pipe showing my gate apparatus incorporated therein and showing the gate closed; Fig. 2 is an enlarged inside elevational view of the gate apparatus shown in connection with a fragmentary portion of the pipe and showing the gate partially open; Fig. 3 is a transverse sectional view from the line 3—3 of Fig. 2; Fig. 4 is a transverse sectional view from the line 4—4 of Fig. 2; Fig. 5 is a fragmentary longitudinal sectional view from the line 5—5 of Fig. 2; Fig. 6 is an inside elevational view of the gate apparatus in a slightly modified form from that of Figs. 1 to 5 inclusive and showing the gate closed and Fig. 7 is a sectional view from the line 7—7 of Fig. 6.

Similar characters of reference refer to similar parts and portions throughout the several views of the drawings:

Figure 1 shows a fragmentary section of a conventional surface irrigation pipe 1, which is usually round in cross section and usually made of galvanized sheet metal. In the side of this pipe 1 is provided an inwardly set flat portion 1b in which is provided an opening 1a which is elongated as shown, the longitudinal axis thereof extending longitudinally with the longitudinal axis of the pipe, and it is preferred that the ends of the elongated opening be rounded as shown in the drawings. On the inside of the pipe is mounted a gate supporting member or cage 2, which cage is provided with a flat portion 2a which rests tightly against the inner side of the flattened portion 1b in which the opening 1a is located. The portion 1b is bent inwardly at 1c as shown best in Fig. 3 of the drawings, at its edge surrounding the opening 1a and the inner edge of the portion 2a is clinched around the inner edge 1c forming a broadened reinforced gate seat 2b at the periphery of the opening 1a which extends inwardly some distance from the main portion 2a as shown best in Fig. 3 of the drawings. Against this gate seat 2b, a gate member 3 is positioned and rests tightly against said seat. This gate member 3 is made of relatively thin sheet metal so that it gives slightly by pressure, and it is supported tightly against the seat 2b by means of a spring plate 4 which is provided with two longitudinally engaging portions 4a and 4b in spaced relation from the center which rests against the inner side of the gate member 3 some distance on each side of its longitudinal axis and extends outwardly from the gate member 3 intermediate the portions 4a and 4b and is warpable therebetween in spaced relation therefrom. The opposite edges of the member 4 then extend outwardly by means of portions 4c to approximate alinement with the side edges of the gate 3 as shown best in Figs. 3 and 4 of the drawings. The outer edges of the portions 4c are supported by means of the flange member 2c on the opposite sides of the member 2 which are supported by the side members 2d at substantially right angles thereto and integrally connected with the outer portions 2a, thus forming trough like grooves and guides for the gates 3 and spring member 4, said spring member 4 being connected to the gate 3 at one end by means of integral clip members 3a which extend outwardly from the gate member 3 to permit the insertion of the member 4 at the points 4a and 4b.

The gate 3, it will be noted is a flat rectangular, slightly flexible member. The spring member 4 is provided with a plurality of slots 4d in the portions 4c and in spaced relation to each other which serve as weakening portions so as to permit great flexibility of the member 4 so that the sections between these slots 4d may bend or give relatively to the portions between other slots to provide for bends or curves between the gate surface and the bearing surface 2c longitudinally of the pipe. The gate 3 is provided with a cup shaped key receiving member 5 which is provided with enlarged portion 5a which rests against the outer side of the gate and is provided with a plurality of integral lug portions 5b which are clamped against the inner side of the gate for securing this cup shaped member 5 securely in the gate member 3, and the spring member 4 is provided with an opening at the middle near one end, adapted to fit over the inwardly extended portion of the member 5 after the other end is inserted under the clip members 3a so that when the gate 3 and spring member 4 thus assembled are positioned between the seat 2b and the portion 2c of the member 2, the members 3 and 4 are held in assembled relation as shown best in Figs. 2, 3, and 4 of the drawings.

This member 5 is adapted at its outer side to engage the opposite ends of the opening 1a in both the opened and closed position of the gate and serves as a stop for the gate in both open and closed position as well as for receiving a key for facilitating the shifting of the gate.

It will be noted that the spring member 4 with the metal warpable portion 4e and with the engageable portions 4a and 4b and then with the angular outwardly extending weakened portions 4c forms a spring member for supporting the gate against its engaging seat surface of the cage 2 that provides spaced engaging members against the gate and forms pressure throughout the full length of the gate adjacent the seat portion which will form a tight fit at all times even if the portion 2c on the gate 3 is warped or slightly bent, thus providing a tight fit between the gate and its seat at all times. At both ends of the cage 2, there is a rib portion 2e which extends inwardly to approximately a level with the surface 2b to support the gate 3 and prevent its tilting when the gate is in open position. The ends of the portions 2c at opposite ends of the gate 2 are set downwardly at an angle at 2f as shown best in Fig. 5 of the drawings to facilitate insertion of the gate 3 and spring 4 in assembling.

In the modified form of construction shown in Figs. 6 and 7 of the drawings, the gate apparatus is the same throughout except that the spring member 4 with the engageable portions 4a and 4b are set outwardly at the middle (as shown by 4f and 4g) to provide a closer bearing fit of the spring member adjacent the edge of the elongated opening shown by dotted lines in Fig. 6 of the drawings, while at the ends 4h and 4i they extend inwardly to provide a support over the end of the oblong opening as shown by dotted line in Fig. 6 of the drawings. This provides a spring support for supporting the gate at the proper place to provide for engagement all around the oblong opening portion so that the gate will not leak.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. In a gate structure for irrigation pipes, the combination with a round pipe wall having a fluid opening with the edge surrounding said opening turned inwardly forming a straight seat longitudinally in the inner side of said pipe surrounding said opening, of a gate shiftably mounted longitudinally of said pipe at the inside of the wall and shiftable over the opening against said seat, and a spring member engaging said gate by spaced portions inwardly some distance from the side walls of the opening and extending outwardly therefrom for holding said gate tightly against the wall of the opening.

2. In a gate structure for irrigation pipes, the combination with a round pipe wall having a fluid opening with the edge surrounding said opening turned inwardly forming a straight seat longitudinally in the inner side of said pipe surrounding said opening, of a gate shiftably mounted longitudinally of said pipe at the inside of the wall and shiftable over the opening against said seat, and a spring member engaging said gate by spaced portions inwardly some distance from the side walls of the opening and extending outwardly therefrom for holding said gate tightly against the wall of the opening, said spring member provided with weakened portions at its opposite sides to facilitate the complete engagement of the gate with its seat.

3. In a gate structure for irrigation pipes, the combination with a round pipe wall having a fluid opening with the edge surrounding said opening turned inwardly forming a straight seat longitudinally in the inner side of said pipe surrounding said opening, of a gate shiftably mounted longitudinally of said pipe at the inside of the wall and shiftable over the opening against said seat, a spring member engaging said gate by spaced portions inwardly some distance from the side walls of the opening and extending outwardly therefrom for holding said gate tightly against the wall of the opening, said spring member provided with weakened portions at its opposite sides to facilitate the complete engagement of the gate with its seat, and combined key receiving and stop means secured to said gate and extending inwardly and outwardly of said gate.

4. In a gate structure for round irrigation pipes, the combination with a pipe wall having an elongated longitudinally disposed fluid opening with the inner edge of said opening turned inwardly to form a straight seat around the inner side of said opening, of a gate shiftably mounted longitudinally of said pipe shiftable wholly therein at the inner side of said pipe over said opening against said seat, said gate having means at its outer side for shifting the gate longitudinally to closed and opened positions with respect to the opening from the outside of the inclosure and through the opening, said shifting means including a cup like member projecting outwardly from the outer wall of the gate for forming a stop for said gate in both opened and closed positions, and resilient means engaging said gate in spaced relation from the longitudinal axis of said gate and warpable between said engaging portions and its sides extending outwardly for holding said gate tightly against its seat.

5. In a gate structure for round irrigation pipes, the combination with a pipe wall having elongated longitudinally disposed fluid opening with the inner edge of said opening turned inwardly to form a straight seat around the inner side of said opening, of a gate shiftably mounted longitudinally of said pipe shiftable wholly therein at the inner side of said pipe over said opening against said seat, said gate having means at its outer side for shifting the gate longitudinally to closed and opened positions with respect to the opening from the outside of the inclosure and through the opening, said shifting means including a cup like member projecting outwardly from the outer wall of the gate for forming a stop for said gate in both opened and closed positions, and resilient means engaging said gate in spaced relation from the longitudinal axis of said gate and warpable between said engaging portions, its sides extending outwardly for holding said gate tightly against its seat, said resilient means provided with weakened portions at its opposite sides between the engaging portions and its outer edges.

6. In a gate structure for irrigation pipes, the combination with a round pipe wall having a fluid opening with the edges surrounding said opening turned inwardly forming a straight seat longitudinally in the inner side of said pipe surrounding said opening, of a gate shiftably mounted longitudinally of said pipe at the inside of the wall and shiftable over the opening against said seat, a spring member provided with spaced gate engaging portions on opposite sides of its longitudinal axis and extending substantially the length of said gate, said gate engaging portions being spaced wider at the middle portion of said gate and converging toward the opposite ends.

7. In a gate structure for irrigation pipes, the combination with a round pipe wall having a fluid opening with the edges surrounding said opening turned inwardly forming a straight seat longitudinally in the inner side of said pipe surrounding said opening, of a gate shiftably mounted longitudinally of said pipe at the inside of the wall and shiftable over the opening against said seat, a spring member provided with spaced gate engaging portions on opposite sides of its longitudinal axis and extending substantially the length of said gate, said gate engaging portions being spaced wider at the middle portion of said gate and converging toward the opposite ends, said spring member provided with weakened portions at its opposite sides intersecting said gate engaging portions.

SIGMUND FREY.